(12) United States Patent
Sallam

(10) Patent No.: US 7,571,448 B1
(45) Date of Patent: Aug. 4, 2009

(54) LIGHTWEIGHT HOOKING MECHANISM FOR KERNEL LEVEL OPERATIONS

(75) Inventor: Ahmed S. Sallam, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 907 days.

(21) Appl. No.: 10/902,229

(22) Filed: Jul. 28, 2004

(51) Int. Cl.
  *G06F 9/445* (2006.01)
  *G06F 9/44* (2006.01)
(52) U.S. Cl. .................. 719/331; 717/163; 726/22
(58) Field of Classification Search .............. 719/321, 719/331; 726/22; 717/163
See application file for complete search history.

(56) References Cited

U.S. PATENT DOCUMENTS

| | | |
|---|---|---|
| 4,776,537 A | 10/1988 | Garside et al. |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,432,851 A | 7/1995 | Scheidt et al. |
| 5,450,576 A | 9/1995 | Kennedy |
| 5,530,757 A | 6/1996 | Krawczyk |
| 5,548,532 A | 8/1996 | Menand et al. |
| 5,564,054 A | 10/1996 | Bramnick et al. |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |
| 5,708,776 A | 1/1998 | Kikinis |
| 5,765,151 A | 6/1998 | Senator |
| 5,799,088 A | 8/1998 | Raike |
| 5,802,080 A | 9/1998 | Westby |
| 5,854,759 A | 12/1998 | Kaliski, Jr. et al. |
| 5,922,072 A | 7/1999 | Hutchinson et al. |

(Continued)

FOREIGN PATENT DOCUMENTS

EP   0858031 A1   8/1998

(Continued)

OTHER PUBLICATIONS

Richter, J., Microsoft.com web pages (online). "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner*—Li B Zhen
(74) *Attorney, Agent, or Firm*—Fenwick & West LLP

(57) ABSTRACT

A hooking control manager hooks kernel level operations. The kernel level hooking control manager identifies a kernel level component for which to filter outgoing kernel level system calls. For each of a select set of outgoing kernel level system calls imported by the kernel level component, the kernel level hooking control manager locates the address of the system call in the kernel level component, stores the address, and patches the kernel level component with an address of alternative code to execute when the kernel level component makes the outgoing system call. Upon the unloading of the kernel level hooking control manager, for each call of the select set, the kernel level hooking control manager locates the address of the system call in the kernel level component, and patches the kernel level component so as to restore the stored address.

19 Claims, 4 Drawing Sheets

U.S. PATENT DOCUMENTS

| | | | |
|---|---|---|---|
| 5,956,475 | A | 9/1999 | Burckhartt et al. |
| 5,974,546 | A | 10/1999 | Anderson |
| 6,000,032 | A | 12/1999 | Millard |
| 6,014,744 | A | 1/2000 | McKaughan et al. |
| 6,014,767 | A | 1/2000 | Glaise |
| 6,048,090 | A | 4/2000 | Zook |
| 6,061,788 | A | 5/2000 | Reynaud et al. |
| 6,079,016 | A | 6/2000 | Park |
| 6,088,803 | A | 7/2000 | Tso et al. |
| 6,366,988 | B1 * | 4/2002 | Skiba et al. ............... 711/165 |
| 6,823,460 | B1 * | 11/2004 | Hollander et al. ............ 726/3 |
| 7,216,367 | B2 * | 5/2007 | Szor ........................... 726/25 |
| 2005/0149947 | A1 * | 7/2005 | Callender ................... 719/321 |

FOREIGN PATENT DOCUMENTS

| | | | |
|---|---|---|---|
| WO | WO 93/25024 A1 | 12/1993 | |
| WO | WO 95/15522 A1 | 6/1995 | |
| WO | WO 95/22794 A1 | 8/1995 | |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

* cited by examiner

LIGHTWEIGHT HOOKING MECHANISM FOR KERNEL LEVEL OPERATIONS

TECHNICAL FIELD

This invention pertains generally to computer operating system internals, and more specifically to hooking kernel level operations.

BACKGROUND

In Microsoft Windows NT®, remote clients can read and write to files across the network. The LanManager redirector (RDR) implements the client side of that protocol by converting NT file system requests into SMB protocol (recently renamed CIFS by Microsoft) requests. These requests are then sent to the particular LanManager fileserver for processing. Microsoft's srv.sys is a kernel level operating system component that implements the server side of this interface. As such, srv.sys is not a file system, but rather a fileserver. A system running srv.sys can allow remote users to access any local file system data stored on that particular system. There is a strong need in the software computing industry to filter or simulate the SMB (CIFS) traffic on a Windows NT host machine. Prior to the present invention, there were four technical solutions for doing so, each of which is described herein.

The Andrew File System (AFS), the popular distributed file system product from CMU and TransArch runs an SMB proxy server in user mode as a way to provide a different SMB (CIFS) server that co-exists with the actual Windows srv.sys. AFS is implemented as a SMB loop-back server that runs in user mode. By running in user-mode, AFS faced many challenges including securing fileserver data (fileserver metadata, the file data cache, etc.), performance degradation from running in user mode (as data had to be copied between user-mode address space and kernel-mode address space to satisfy every SMB request) and the inability to use the system standard buffer cache, which is managed by the NT kernel-mode cache manager (therefore, the same file buffer data could be located in two different buffer caches).

AFS also had to support different versions of the SMB protocol to be fully compatible with different Windows workstations that run different versions of the Windows operating system. Every Windows NT version comes with its own version of the SMB (CIFS) protocol (this is called the protocol dialect). This required continuous and intensive reverse engineering effort to explore the internals of the protocol. The AFS Windows implantation was not practical, and failed to meet the industry requirements because it lacked software security, system stability, system performance, platform compatibility and use of standard NT buffer cache. One attempt to improve the AFS approach was to run the SMB loop back server in kernel mode. This solved the performance and security problems, but did not solve the stability and platform compatibility problems.

Another approach involves building a file system filter driver that attaches to the local file system drivers running on the local system. Developing a file system filter driver for Windows is a very challenging task. The file system framework in Windows NT is very complicated and is not well documented by Microsoft. Thus, developing a file system filter driver requires an intensive amount of knowledge about the internals of the operating system and the behavior of different low-level system components.

Another drawback to building a file system filter driver is that all the local file system traffic is filtered whether it originated from local components running on the local host machine (such as a user mode process or kernel-mode device drivers that needs access to local file systems), or whether it is remote file access traffic that is coming from the network through the srv.sys driver. Filtering all the local file system activities introduces system performance regression.

Additionally, with this approach it challenging to identify which calls originated from srv.sys, because srv.sys queues all its requests, which are then served by a generic system worker thread. The context of the local thread is lost during this transition.

Thus, although the file system filter driver approach runs in kernel mode and utilizes the system buffer cache, it still has the following drawbacks: it is very hard to develop and maintain, it filters local traffic, it introduce an overall system performance regression, it is hard to identify the call context and it can affect system stability.

The Samba team started a project to develop a 5 MB server (like the AFS approach) that runs on a UNIX® host machine instead of running on a Windows NT machine. Samba has gained popularity in the network storage arena, especially for companies that are building new network storage architectures that requires a smooth integration with the Windows host machines. Despite its popularity, Samba still suffers from drawbacks. Samba runs in user space so it is performance and security are not as desired. Additionally, Samba's Windows platform compatibility is a problem, because Samba is another type of SMB emulator and not a native Windows solution.

What is needed are methods, systems and computer readable media for filtering the Windows NT fileserver (srv.sys) activities that avoid all the drawbacks mentioned above. Thus, the solution should run in kernel-mode, so as to avoid the security and performance drawbacks associated with user-mode solutions. The solution should not require developing a file system filter driver, should not filter all the local file system activities, should not affect the overall system performance and should not rely on the SMB (CIFS) protocol semantics.

SUMMARY OF INVENTION

The present invention comprises methods, systems and computer readable media for hooking kernel level operations. A kernel level hooking control manager identifies a kernel level component for which to filter outgoing kernel level system calls. For each of a select set of outgoing kernel level system calls imported by the kernel level component, the kernel level hooking control manager locates the address of the system call in the kernel level component, stores the address, and patches the kernel level component with an address of alternative code to execute when the kernel level component makes the outgoing system call. Upon the unloading of the kernel level hooking control manager, for each call of the select set, the kernel level hooking control manager locates the address of the system call in the kernel level component, and patches the kernel level component so as to restore the stored address.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
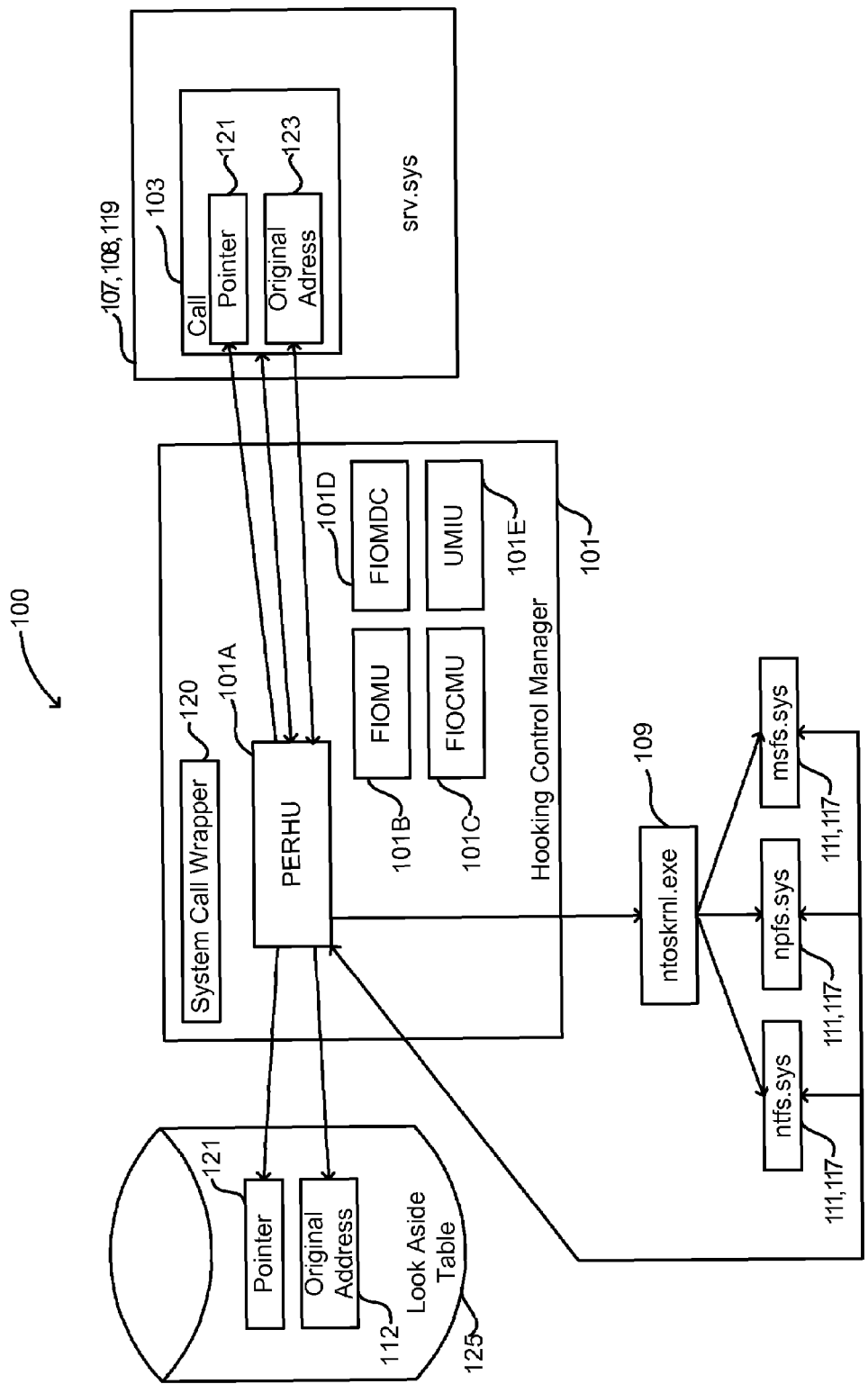
FIG. 1 is a block diagram illustrating a high level overview of a system for practicing some embodiments of the present invention

FIG. 1 illustrates a high level overview of a system 100 for performing some embodiments of the present invention. A hooking control manager 101 hooks outgoing calls 103 from an operating system module which serves remote file input-output requests 107. It is to be understood that although the hooking control manager 101 is illustrated as a single entity, as the term is used herein a hooking control manager 101 refers to a collection of functionalities which can be implemented as software, hardware, firmware or any combination of the three. Where a hooking control manager 101 is implemented as software, it can be implemented as a standalone program, but can also be implemented in other ways, for example as part of a larger program, as a plurality of separate programs, or as one or more statically or dynamically linked libraries.

In a current Microsoft Windows NT® configuration (including versions of Windows based on NT, such as XP, 2000 and 2003), the operating system module which serves remote file requests 107 is called srv.sys 108, as is illustrated in FIG. 1. In these configurations, the system kernel module 109 is called ntoskrnl.exe. Various file system drivers 111 exist, for example ntfs.sys (the NT file system driver), msfs.sys (the mail slots file system driver) and npfs.sys (the named pipes files system driver). The role of the kernel module 109 and file system drivers 111 is explained in detail below. Of course, the present invention is not tied to these names specifically, and in various embodiments of the present invention the described components can have other names as desired. For example, these components might have different names in future or different versions of Windows, all of which would be within the scope of the present invention.

As illustrated in FIG. 1, the hooking control manager 101 hooks the function call interface through which srv.sys 108 issues file input-output requests 103 to the system kernel module 109, and applies controlling logic at that point. More specifically, the hooking control manager 101 hooks outgoing calls 103 from srv.sys 108 to the system kernel module 109, and enforces an external control mechanism over the calls 103 of interest.

The hooking control manager 101 is implemented as a kernel mode component, typically in the form of a regular Windows device driver. The hooking control manager 101 supports regular Interrupt Request Packet (IRP) messages, as does any other normal device driver. The hooking control manager 101 can be thought of as comprising the following sub-modules: a portable executable runtime hooking unit (PERHU) 101A, a file input-output (I/O) management unit (FIOMU) 101B, a file I/O context management unit (FIOCMU) 101C, a file I/O metadata cache (FIOMDC) 101D and a user-mode interface unit (UMIU) 101E. These modules are described in detail below. Note that although these modules are illustrated as discrete entities, each of these modules refers to a collection of functionalities which can be implemented as software, hardware, firmware or any combination of the three. Where one of these modules is implemented as software, it can be implemented as a standalone program, but can also be implemented in other ways, for example as part of a larger program, as a plurality of separate programs, or as one or more statically or dynamically linked libraries. Some embodiments of the present invention have fewer or more modules (functionalities), as desired, and as discussed below.

The PERHU 101A is responsible for hooking all the outgoing function calls 103 from srv.sys 108 to any other Windows kernel system component. In one embodiment, the PERHU 101A takes the following input parameters: the name of at least one source module 117 (which can be any module that has exported functions, such as a file system driver 111) containing functions to redirect; the name of the target module 119 (the module from which outgoing functions calls are to be redirected, e.g., srv.sys 108); an array of functions names (or ordinals) exported from the source module 117, to be hooked; an array of new addresses to replace the original addresses in the target module 119 with those new addresses (i.e., an array of addresses of code to be executed when the hooked functions are called, such code being located, for example, in a system call wrapper 120); the number of elements in the arrays mentioned previously; and a flag to specify whether the target module 119 code sections are to be scanned for explicit function calls. Of course, in other embodiments of the present invention, the input parameters and the format thereof can vary. For example, in one embodiment the flag is omitted, whereas in other embodiments data structures other than arrays are used to store function names and/or addresses (e.g., a linked list). Note that in FIG. 1, a system call wrapper 120 is illustrated as being a part of the hooking control manager 101, but in other embodiments the code to be executed when the hooked functions are called is located elsewhere, as desired.

Upon system activation, the PERHU 101A identifies the base address of the target module 119 in memory. It then does a memory scan inside the portable executable (Windows executable file format) headers, and the imported functions section of the target module 119. If need be, it reads some of these data from disk (i.e., if some data are not available in memory).

After the memory scan operation, the PERHU 101A calculates a memory pointer (imported-function-pointer 121) that points to the location where the imported function address is stored in memory. In some embodiments, the PERHU 101A reads the content of the imported-function-pointer 121, which represents the original address 123 of the imported-function. The PERHU stores the imported-function-pointer 121 and the original address 123 of the imported function in a look-aside table 125 (or other data structure), to use to restore the system 100 to its original values during the device driver unload operations. Knowing the imported-function-pointer 121 as calculated above, the PERHU 101A patches this with the new desired address passed in as a parameter to the module, thereby hooking that function. The PERHU 101A repeats these steps for every item in the passed in arrays.

In embodiments that use the scan flag, if the passed in scan flag is on, then the PERHU 101A identifies the base address of the source module 117 in memory. It then does a memory scan inside the portable executable headers and the exported functions section (it reads data from disk if some data are not available in memory). Knowing the function name (or ordinal) of the function to be hooked, the PERHU 101A reads the function address of the exported-function from the exported section.

The PERHU 101A then constructs a near call instruction (not illustrated) with the address of the exported-function. The PERHU 101A then searches through all the code sections of the target module 119, and patches the addresses where there is a match with the new address. Every patched location address as well as the original function are stored in the look-aside table to be used while unloading the driver.

Upon unloading the device driver, the PERHU 101A scans the look-aside table 125, and for each entry therein patches the address back with its original address.

In some embodiments, the PERHU 101A holds a system level spin lock to ensure that srv.sys 108 will not be active or called while the PERHU 101A is modifying the module run time image in memory. Typically, the PERHU 101A ensures that it has enough page level access rights to patch the address. If it does not have enough access rights then it will change the page directory attributes in the page directory, and/or the page attributes in the page table entries (PTE). The PERHU 101A also typically makes sure that the patched memory pages are locked in memory to ensure that the new changes will not be discarded if the page is swapped out.

Figure 2:
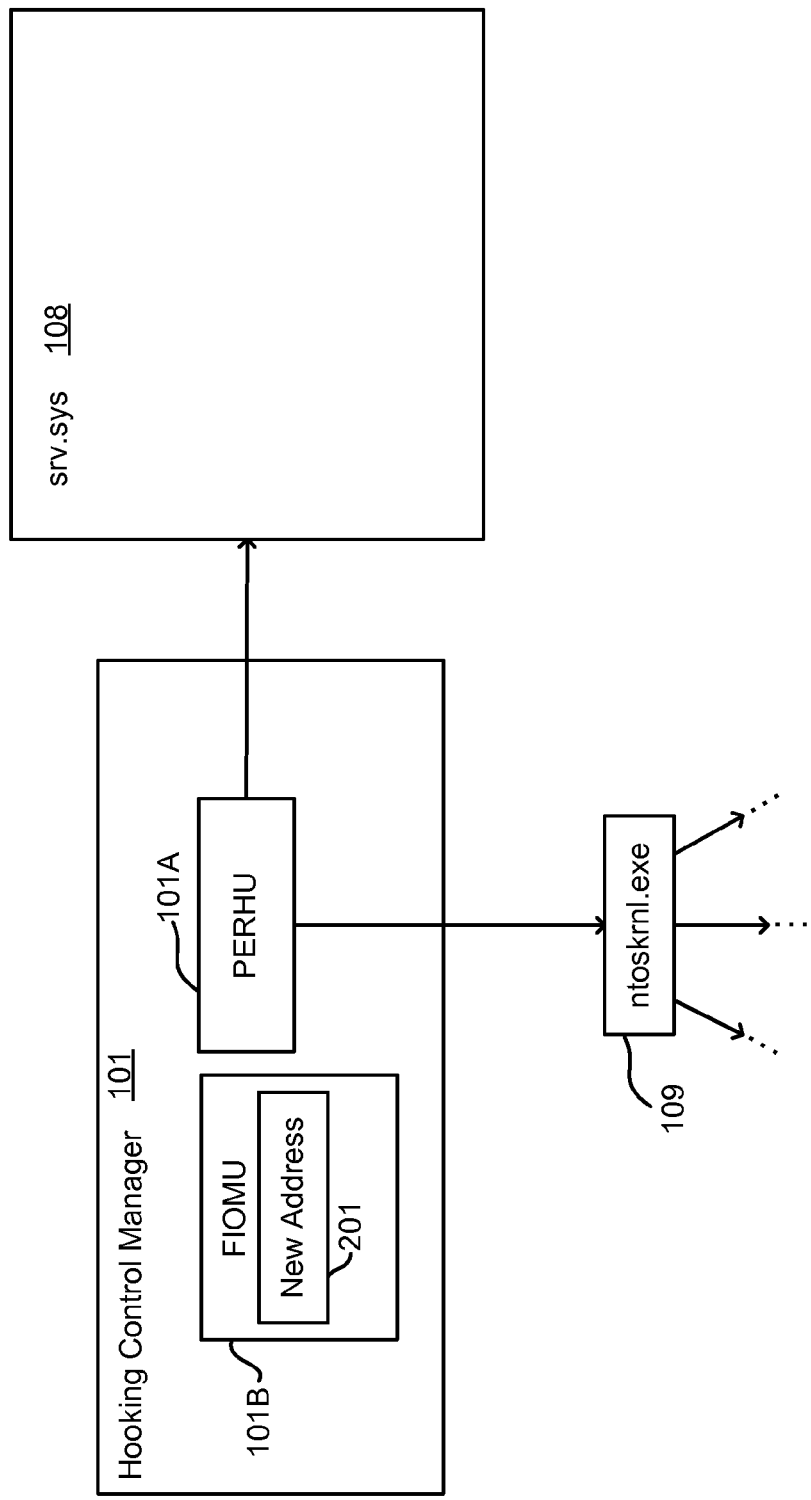
FIG. 2 is a block diagram illustrating that a file I/O management unit can be customized based upon the desired purpose of hooking select outgoing functions, according to some embodiments of the present invention.

Turning now to FIG. 2, the file I/O management unit (FIOMU) 101B can be customized based upon the desired purpose of hooking outgoing functions 103 made by srv.sys 108, which is a variable design choice. For example, in the context of an Internet Intrusion Detection and Prevention System, the FIOMU 101B can prevent select files from being copied over the network, and can contact a network policy server to enforce a desired file access policy. In an alternative example in which a Network Storage Distributed File System is being implemented, the FIOMU 101B can redirect the file I/O operations to another remote server through a different file sharing protocol. The FIOMU 101B typically contains the new function addresses 201 for the redirected functions.

The design of the FIOMU 101B is very generic, and supports hooking any function call made by srv.sys 108 to any other kernel level module. Which functions to hook depends upon the specific implementation. For example, in an implementation focusing on file access operations, the FIOMU 101B could hook functions such as:

ntXYZ functions, for example ntOpenFile, ntReadFile, ntWriteFile, etc.

zwXYZ functions, for example zwOpenFile, zwReadFile, zwWriteFile, etc.

IoXYZ functions; several IoXYZ functions are called from inside srv.sys 108, including IoCreateFile, IoSetFileOrigin, IoGetRelatedDeviceObject, IoCancelIrp, IoQueueThreadIrp, IoQueueWorkItem, IoFreeWork Item, IoIsFileOriginRemote (XP and Windows 2003 server only), NtQueryInformationFile, NtQueryQuotaInformationFile, NtQueryVolumeInformationFile, etc.

IRP management functions such as IofCallDriver, IofCompleteRequest, IoInitializeIrp, IoFreeIrp, etc. Note that srv.sys 108 reuses IRPs. More specifically, the IRP structure is created once and then reused several times to issue different IofCallDriver calls. The FIOMU 101B is configured to take account of this, and thus is able to distinguish different calls to different drivers.

The FIOMU 101B can also hook memory description Lists (MDL) cache access functions. Srv.sys 108 relies on the system cache manager to cache the buffer data of the files accessed for both read and write operations. While using IofCallDriver to issue an IRP_MJ_READ or IRP_MJ_WRITE, srv.sys 108 makes sure that the BUFFERED I/O flag is specified. This flag instructs the local file system driver to execute the file operation through the system cache. In addition, it also specifies certain IRP_MN_MDL_XX flags so that the operation is done directly by accessing the MDL. MDL file operations save the time taken to copy data between srv.sys 108 data buffers and the cache manager buffers, as they both share the same buffers.

Srv.sys 108 calls the following MDL cache access functions, all of which can be hooked as desired: FsRtlMdlReadDev, FsRtlMdlReadCompleteDev, FsRtlPrepareMdlWriteDev, FsRtlMdlWriteCompleteDev.

In some embodiments, the FIOMU 101B hooks various security functions as desired. For example, srv.sys 108 issues calls to the kernel module 109 to check the access for file and directory objects. It also issues other calls to the ksecdd.sys (kernel security device driver), which is a central device driver that provides the core functionality of many security interfaces in kernel mode. Some examples of the functions that can be hooked in this context are:

NTOSKRNL functions such as SeAccessCheck, IoCheckDesiredAccess, IoCheckFunctionAccess, NtQuerySecurityObject, SeSinglePrivilegeCheck, SeQueryAuthenticationIdToken, etc.

ksecdd.sys functions such as ImpersonateSecurityContext, QueryContextAttributesW, etc.

Of course, the specific functions to hook are a variable design choice. Additionally, functions can have different names in different versions of Windows, none of which limits the scope of the present invention.

Figure 3:
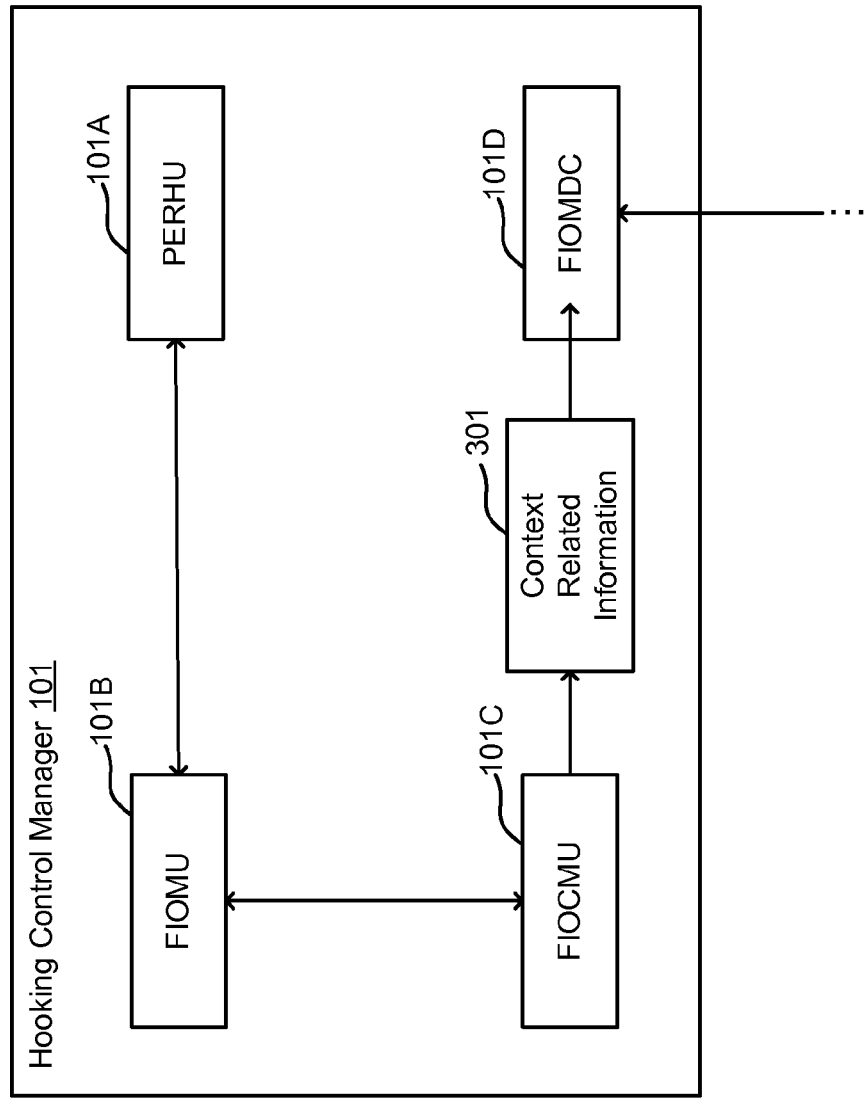
FIG. 3 is a block diagram illustrating a file I/O context management unit, according to some embodiments of the present invention.

Turning to FIG. 3, some embodiments of the present invention include a file I/O context management unit (FIOCMU) 101C. The FIOCMU 101C is a helper module that can be called by the FIOMU 101B to extract certain context related information 301 for storage in the file I/O metadata cache (FIOMDC) 101D, which functions as a look-aside cache table. Of course, other formats can be used for storing context related information 301 in other embodiments of the present invention. The FIOCMU 101C provides access to this look-aside table 101D to other components that would make use of the context related information 301 stored therein. Typical examples would be to provide this information 301 to a file system filter driver, to identify whether the current call originates from srv.sys 108, and to use the cached file information 301 directly without having to issue any additional file I/O calls. The specific format of the FIOMDC 101D is a variable design choice, but typically it is built such that any entry can be located easily, for example through a hash value constructed from certain input fields.

Figure 4:
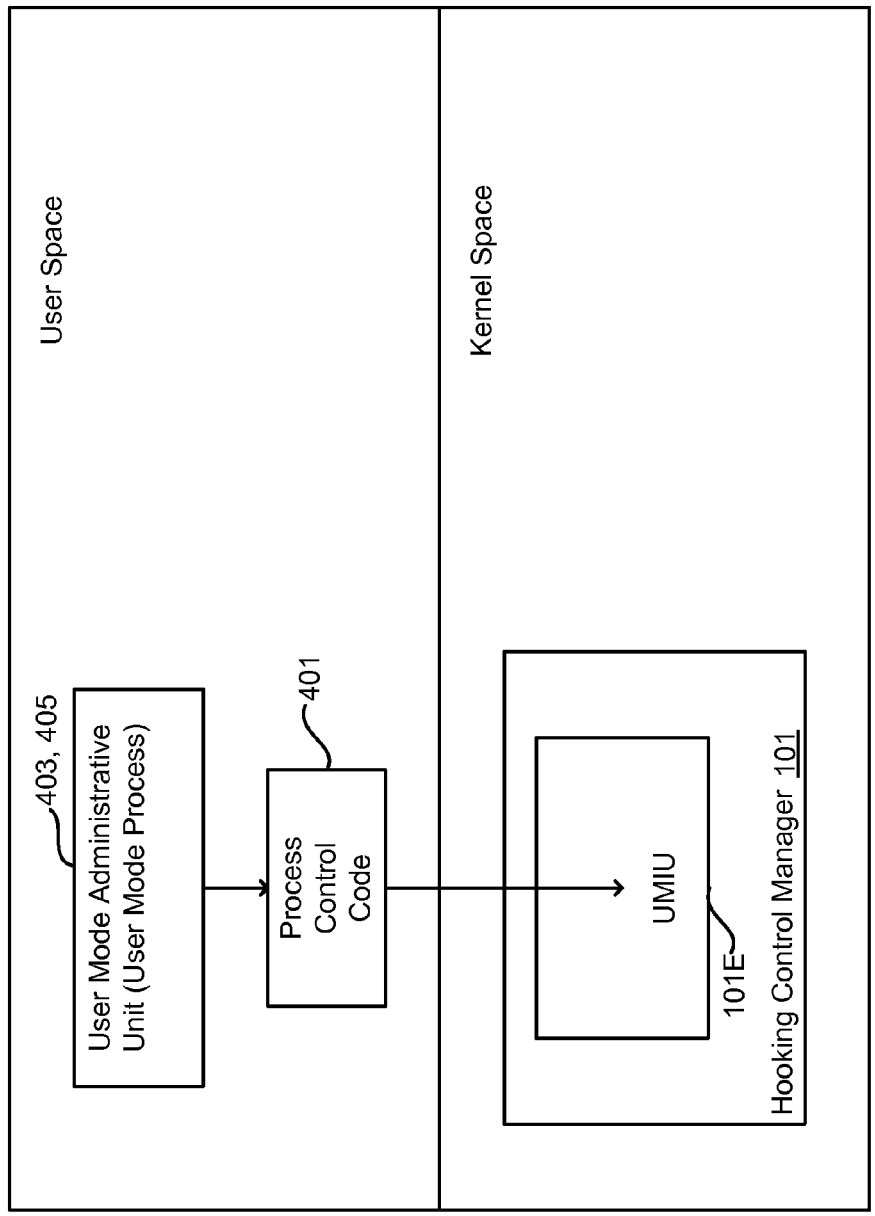
FIG. 4 is a block diagram illustrating a user-mode interface unit processing control codes sent from a process in user space, according to some embodiments of the present invention.

As illustrated in FIG. 4, some embodiments include a user-mode interface unit (UMIU) 101E, which can process control codes 401 sent from a process 403 in user space. The process 403 in user space can send such control codes 401 to customize the behavior of the kernel-mode operation, or to access collected file I/O information. This process 401 can be in the form of a separate user mode administrative unit 405, which is responsible for communicating from user space.

Some embodiments of the present invention run under Windows 9x (e.g., 95, 98) and/or Windows Me. As will be understood by those of ordinary skill in the relevant art, the concepts described above can be applied within the context of these and other versions of Windows. Windows 9x and Windows Me have a srv.sys 108 like component that runs in kernel-mode, although the hooking mechanism is different. Originally, Windows 9x and both had a different framework and file format for kernel mode device drivers, called Virtual Device Drivers (VxDs). Hooking VxDs services was much easier in Windows 9x and Me than in Windows NT, as Windows 9x and Me provided a standard service for that, which is known to those of ordinary skill in the relevant art. However, Microsoft later introduced the Windows Driver Model (WDM) to make it possible to develop portable executable (PE) device drivers that runs on Windows 98 and Me. Relevant embodiments of the present invention can be applied to these WDM drivers. Note that the names of some of the interface functions to be hooked can be different in such an environment.

The present invention provides a lightweight, flexible hooking mechanism for filtering srv.sys 108 I/O traffic. The present invention is agnostic to the network file sharing protocol used by the Windows LAN Manager server. Therefore, if Microsoft is to switch to another file sharing protocol instead of CIFS (SMB), the present invention will still be functional and useful.

Additionally, the present invention also provides the ability to filter other important server activities, for example authentication operations, thread impersonation and access control check. The implementation mechanics for such embodiments will be readily apparent to those of ordinary skill in the relevant art in light of this specification and its associated figures. Because the hooking control manager 101 is typically inserted in the Windows NT system at a layer that is part of the file system framework, it has open access to various I/O manager services, as well as other kernel mode services.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for hooking kernel level operations, the method comprising the steps of:
   a kernel level hooking control manager identifying a kernel level component for which to filter outgoing kernel level system calls, wherein the kernel level component comprises srv.sys;
   for each of a select set of outgoing kernel level system calls imported by the kernel level component, the kernel level hooking control manager performing the following steps:
      locating an address of the system call in an imports section of the kernel level component;
      storing the address externally to the kernel level component; and
      patching the imports section of the kernel level component with an address of alternative code to execute when the kernel level component makes the outgoing system call.

2. The method of claim 1 further comprising:
   upon unloading of the kernel level hooking control manager, for each of a select set of outgoing kernel level system calls imported by the kernel level component, the kernel level hooking control manager performing the following steps:
      locating the address of the system call in the kernel level component; and
      patching the kernel level component so as to restore the stored address of the system call.

3. The method of claim 1 wherein:
   the kernel level hooking control manager is instantiated as a device driver.

4. The method of claim 1 wherein the select set of outgoing kernel level system calls imported by the kernel level component includes at least one system call from a group of systems calls consisting of:
   ntOpenFile;
   ntReadFile;
   ntWriteFile;
   zwOpenFile;
   zwReadFile;
   zwWriteFile;
   IoCreateFile;
   IoSetFileOrigin;
   IoGetRelatedDeviceObject;
   IoCancelIrp;
   IoQueueThreadIrp;
   IoQueueWorkItem;
   IoFreeWorkItem;
   IoIsFileOriginRemote;
   NtQueryInformationFile;
   NtQueryQuotaInformationFile;
   NtQueryVolumeInformationFile;
   IofCallDriver;
   IofCompleteRequest;
   IoInitializeIrp;
   IoFreeIrp;
   FsRtlMdlReadDev;
   FsRtlMdlReadCompleteDev;
   FsRtlPrepareMdlWriteDev;
   FsRtlMdlWriteCompleteDev;
   SeAccessCheck;
   IoCheckDesiredAccess;
   IoCheckFunctionAccess;
   NtQuerySecurityObject;
   SeSinglePrivilegeCheck;
   SeQueryAuthenticationIdToken;
   ImpersonateSecurityContext; and
   QueryContextAttributesW.

5. The method of claim 1 further comprising:
the kernel level hooking control manager storing context related information; and
the kernel level hooking control manager providing at least one external kernel level component access to stored context related information.

6. The method of claim 1 further comprising:
the kernel level hooking control manager receiving at least one control code from a user mode process; and
the kernel level hooking control manager processing the received control code.

7. The method of claim 6 wherein the kernel level hooking control manager processing the received control code further comprises a step from a group of steps consisting of:
the kernel level hooking control manager customizing its behavior in response to the control code; and
the kernel level hooking control manager providing data to the user mode process.

8. A computer readable medium storing a computer program product for hooking kernel level operations, the computer program product comprising:
program code for identifying a kernel level component for which to filter outgoing kernel level system calls, wherein the kernel level component comprises srv.sys;
program code for performing the following steps for each of a select set of outgoing kernel level system calls imported by the kernel level component:
locating an address of the system call in an imports section of the kernel level component;
storing the address externally to the kernel level component; and
patching the imports section of the kernel level component with an address of alternative code to execute when the kernel level component makes the outgoing system call.

9. The computer program product of claim 8 further comprising:
program code for, upon unloading of a kernel level hooking control manager, for each of a select set of outgoing kernel level system calls imported by the kernel level component, performing the following steps:
locating the address of the system call in the kernel level component; and
patching the kernel level component so as to restore the stored address of the system call.

10. The computer program product of claim 8 wherein the select set of outgoing kernel level system calls imported by the kernel level component includes at least one system call from a group of systems calls consisting of:
ntOpenFile;
ntReadFile;
ntWriteFile;
zwOpenFile;
zwReadFile;
zwWriteFile;
IoCreateFile;
IoSetFileOrigin;
IoGetRelatedDeviceObject;
IoCancelIrp;
IoQueueThreadIrp;
IoQueueWorkItem;
IoFreeWorkItem;
IoIsFileOriginRemote;
NtQueryInformationFile;
NtQueryQuotaInformationFile;
NtQueryVolumeInformationFile;
IofCallDriver;
IofCompleteRequest;
IoInitializeIrp;
IoFreeIrp;
FsRtlMdlReadDev;
FsRtlMdlReadCompleteDev;
FsRtlPrepareMdlWriteDev;
FsRtlMdlWriteCompleteDev;
SeAccessCheck;
IoCheckDesiredAccess;
IoCheckFunctionAccess;
NtQuerySecurityObject;
SeSinglePrivilegeCheck;
SeQueryAuthenticationIdToken;
ImpersonateSecurityContext; and
QueryContextAttributesW.

11. The computer program product of claim 8 further comprising:
program code for storing context related information; and
program code for providing at least one external kernel level component access to stored context related information.

12. The computer program product of claim 8 further comprising:
program code for receiving at least one control code from a user mode process; and
program code for processing the received control code.

13. The computer program product of claim 12 wherein the program code for processing the received control code further comprises program code from a group of program codes comprising:
program code for customizing kernel level behavior in response to the control code; and
program code for providing data to the user mode process.

14. A computer system for hooking kernel level operations, the computer system comprising:
a computer readable medium storing software portions comprising:
a software portion configured to identify a kernel level component for which to filter outgoing kernel level system calls, wherein the kernel level component comprises srv.sys;
a software portion configured to perform the following steps for each of a select set of outgoing kernel level system calls imported by the kernel level component:
locating an address of the system call in an imports section of the kernel level component;
storing the address externally to the kernel level component; and
patching the imports section of the kernel level component with an address of alternative code to execute when the kernel level component makes the outgoing system call; and
a processor configured to execute the software portions stored by the computer readable medium.

15. The computer system of claim 14, the computer readable medium further comprising:
a software portion configured to perform the following steps upon unloading of a kernel level hooking control manager, for each of a select set of outgoing kernel level system calls imported by the kernel level component:
locating the address of the system call in the kernel level component; and
patching the kernel level component so as to restore the stored address of the system call.

16. The computer system of claim 14 wherein the select set of outgoing kernel level system calls imported by the kernel level component includes at least one system call from a group of systems calls consisting of:
ntOpenFile;
ntReadFile;
ntWriteFile;
zwOpenFile;
zwReadFile;
zwWriteFile;
IoCreateFile;
IoSetFileOrigin;
IoGetRelatedDeviceObject;
IoCancelIrp;
IoQueueThreadIrp;
IoQueueWorkItem;
IoFreeWorkItem;
IoIsFileOriginRemote;
NtQueryInformationFile;
NtQueryQuotaInformationFile;
NtQueryVolumeInformationFile;
IofCallDriver;
IofCompleteRequest;
IoInitializeIrp;
IoFreeIrp;
FsRtlMdlReadDev;
FsRtlMdlReadCompleteDev;
FsRtlPrepareMdlWriteDev;
FsRtlMdlWriteCompleteDev;
SeAccessCheck;
IoCheckDesiredAccess;
IoCheckFunctionAccess;
NtQuerySecurityObject;
SeSinglePrivilegeCheck;
SeQueryAuthenticationIdToken;
ImpersonateSecurityContext; and
QueryContextAttributesW.

17. The computer system of claim 14, the computer readable medium further comprising:
a software portion configured to store context related information; and
a software portion configured to provide at least one external kernel level component access to stored context related information.

18. The computer system of claim 14, the computer readable medium further comprising:
a software portion configured to receive at least one control code from a user mode process; and
a software portion configured to process the received control code.

19. The computer system of claim 18 wherein the software portion configured to process the received control code further comprises a software portion from a group of software portions comprising:
a software portion configured to customize kernel level behavior in response to the control code; and
a software portion configured to provide data to the user mode process.

* * * * *